(12) United States Patent
Takemura et al.

(10) Patent No.: US 9,683,880 B2
(45) Date of Patent: Jun. 20, 2017

(54) SETTING METHOD OF FLOW METER DEVICE AND FLOW METER DEVICE

(71) Applicant: Panasonic Corporation, Kadoma-shi, Osaka (JP)

(72) Inventors: Kouichi Takemura, Nara (JP); Aoi Watanabe, Nara (JP); Yasuo Koba, Nara (JP); Masato Satou, Nara (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 510 days.

(21) Appl. No.: 14/367,810

(22) PCT Filed: Dec. 26, 2012

(86) PCT No.: PCT/JP2012/008305
§ 371 (c)(1),
(2) Date: Jun. 20, 2014

(87) PCT Pub. No.: WO2013/099233
PCT Pub. Date: Jul. 4, 2013

(65) Prior Publication Data
US 2015/0292925 A1  Oct. 15, 2015

(30) Foreign Application Priority Data
Dec. 26, 2011  (JP) .................. 2011-283202

(51) Int. Cl.
*G01F 1/00* (2006.01)
*G01F 1/66* (2006.01)
(Continued)

(52) U.S. Cl.
CPC .......... *G01F 1/66* (2013.01); *G01F 1/667* (2013.01); *G01F 7/00* (2013.01); *G01F 25/0007* (2013.01)

(58) Field of Classification Search
USPC ........................................... 702/48
See application file for complete search history.

(56) References Cited

U.S. PATENT DOCUMENTS 4,581,946 A * 4/1986 Kanayama ............. G01F 1/125
                                                     702/100
6,622,096 B1   9/2003 Ouji
(Continued)

FOREIGN PATENT DOCUMENTS

CN    1754085 A    3/2006
CN    101512302 A  8/2009
(Continued)

OTHER PUBLICATIONS

Extended European Search Report in corresponding European Application No. 12862061.4, dated Feb. 9, 2015, 13 pages.
(Continued)

*Primary Examiner* — Paul D Lee
(74) *Attorney, Agent, or Firm* — Brinks Gilson & Lione

(57) ABSTRACT

A setting method of a flow meter device comprises (A) measuring a compensation coefficient in a case where a fluid is flowed with a flow within a predetermined range, and deriving a first function representing as a linear function a relationship between a measurement compensation coefficient which is the measured compensation coefficient and a conversion value which is obtained by converting a set flow which is the flow of the flowed fluid, using a predetermined function; (B) setting a reference flow which is an arbitrary flow within the predetermined range and calculating a reference compensation coefficient which is a compensation coefficient corresponding to the reference flow based on the reference flow and the first function; and (C) storing the reference flow and the reference compensation coefficient corresponding to the reference flow.

6 Claims, 10 Drawing Sheets

(51) Int. Cl.
*G01F 7/00* (2006.01)
*G01F 25/00* (2006.01)

(56) References Cited

U.S. PATENT DOCUMENTS

| | | | |
|---|---|---|---|
| 6,691,582 B1* | 2/2004 | Nawa | G01N 29/024 |
| | | | 73/861.28 |
| 2002/0178836 A1* | 12/2002 | Shinmura | G01F 1/662 |
| | | | 73/861.29 |
| 2003/0146758 A1* | 8/2003 | Koike | G01F 1/684 |
| | | | 324/453 |
| 2006/0201259 A1 | 9/2006 | Umekage et al. | |
| 2007/0193367 A1 | 8/2007 | Umekage et al. | |
| 2010/0005902 A1 | 1/2010 | Iwanaga et al. | |
| 2010/0114543 A1 | 5/2010 | Namba et al. | |
| 2011/0238333 A1 | 9/2011 | Miyata et al. | |

FOREIGN PATENT DOCUMENTS

| | | |
|---|---|---|
| CN | 102257366 A | 11/2011 |
| EP | 1 921 424 A1 | 5/2008 |
| JP | 3-145549 A | 6/1991 |
| JP | 2001-183199 A | 7/2001 |
| JP | 3487589 B2 | 1/2004 |
| JP | 2005-017152 A | 1/2005 |
| JP | 2010-101767 A | 5/2010 |
| JP | 2010-108360 A | 5/2010 |
| WO | WO 2010/138117 A1 | 12/2010 |

OTHER PUBLICATIONS

International Search Report in corresponding International Application No. PCT/JP2012/008305, dated Apr. 9, 2013, 2 pages.

Office Action and Search Report and English language translation of Search Report, in corresponding Chinese Application No. 201280060644.9 dated Nov. 10, 2015, 9 pages.

* cited by examiner

Fig. 5

| SET FLOW Q(L/h) | MEASUREMENT COMPENSATION COEFFICIENT K |
|---|---|
| 40 | 0.96 |
| 200 | 1.01 |
| 500 | 1.04 |
| 1000 | 1.07 |
| 3000 | 1.10 |
| 6000 | 1.13 |

Fig. 8

| SET FLOW | REFERENCE FLOW | CONVERSION VALUE | FIRST FLOW | MEASUREMENT COMPENSATION COEFFICIENT | REFERENCE COMPENSATION COEFFICIENT |
|---|---|---|---|---|---|
| Q(L/h) | Q1(L/h) | LogQ(L/h) | LogQ1(L/h) | K | K1 |
| 40 | 40 | 1.6021 | 1.6021 | 0.96 | 0.958 |
| — | 70 | — | 1.8451 | — | 0.977 |
| 200 | 200 | 2.3010 | 2.3010 | 1.01 | 1.012 |
| — | 300 | — | 2.4771 | — | 1.025 |
| — | 450 | — | 2.6532 | — | 1.039 |
| 500 | 500 | 2.6990 | 2.6990 | 1.04 | 1.043 |
| — | 750 | — | 2.8751 | — | 1.057 |
| 1000 | 1000 | 3.0000 | 3.0000 | 1.07 | 1.066 |
| — | 2000 | — | 3.3010 | — | 1.090 |
| 3000 | 3000 | 3.4771 | 3.4771 | 1.10 | 1.103 |
| 6000 | 6000 | 3.7782 | 3.7782 | 1.13 | 1.127 |

SETTING METHOD OF FLOW METER DEVICE AND FLOW METER DEVICE

This application is a 371 application of PCT/JP2012/008305 having an international filing date of Dec. 26, 2012, which claims priority to JP2011-283202 filed Dec. 26, 2011, the entire contents of which are incorporated herein by reference.

TECHNICAL FIELD

The present invention relates to a setting method of a flow meter device and a flow meter device.

BACKGROUND ART

A flow meter device measures the flow (rate) of a fluid flowing through a measurement fluid passage. In this flow meter device, the flow velocity of the fluid is compensated (modified) to obtain an average flow velocity in the entire measurement fluid passage by multiplying the measured flow velocity of the fluid by a compensation (modification) coefficient, and the flow (rate) is calculated based on the compensated flow velocity and the cross-sectional area of the measurement fluid passage.

However, the compensation coefficient cannot be set uniquely due to an influence of the configuration of the flow meter device, etc. If setting of the configuration or the like of the flow meter device is changed, then it becomes necessary to newly set the compensation coefficient. There is known a flow coefficient setting method which is intended to automatically set a flow coefficient (compensation coefficient) easily using a personal computer or the like (see e.g., Patent Literature 1).

Hereinafter, the flow coefficient setting method disclosed in Patent Literature 1 will be described with reference to FIG. 10. FIG. 10 is a graph showing a flow velocity (V), a flow coefficient (K), and an approximate line thereof, disclosed in Patent Literature 1.

As shown in FIG. 10, in the flow coefficient setting method disclosed in Patent Literature 1, adjacent data set of an arbitrary number (set of the flow velocity measured by a flow velocity measurement means and a flow coefficient corresponding to the flow velocity), is selected, and an approximate line is calculated using the selected data set.

Specifically, based on measurement points (adjacent data set) 100 to 104 within a region A, an approximate line 10 optimized by a least square method or the like is found. Then, the value of the flow coefficient derived using the approximate line 105 is compared to the value of the flow coefficient derived from the measurement value to determine whether a difference between these values set falls within a predetermined error range. If the difference falls within the predetermined error range, new data set is added, and the range which can be approximated as the approximate line is sequentially derived by the same procedure.

In the flow coefficient setting method disclosed in Patent Literature 1, the flow velocity measured by the flow velocity measurement means and the flow coefficient corresponding to the flow velocity are plotted to calculate an optimal approximate function, and the flow coefficient corresponding to the flow velocity measured by the flow velocity measurement means is calculated using the optimal approximate function.

Patent Literature 1: Japanese Patent Publication No. 3487589

SUMMARY OF THE INVENTION

Technical Problem

However, in general, the relationship between the flow and the compensation coefficient is not linear (linear function). Therefore, in the flow coefficient setting method disclosed in Patent Literature 1, it is necessary to take many measurement points. When these measurement points are approximated by the straight line, the range which can be approximated as the straight line is derived trial and error. Under the circumstance, there exists a first problem that there is a great load imposed on a calculation means for setting the compensation coefficient and a storage means.

In addition, in the flow coefficient setting method disclosed in Patent Literature 1, a quintic function, a logarithm function, or the like is used as an optimal approximate curve. Therefore, there exists a second problem that in a case where the flow (rate) is calculated based on the flow velocity actually measured by the flow velocity measurement means, a calculation load required to calculate the flow coefficient increases, and electric power used to perform the calculation increases.

The present invention is directed to solving at least one of the above described first and second problems, and an object of the present invention is to provide a setting method of a flow meter device which is capable of deriving a compensation coefficient with few measurement points and/or lessening electric power consumption by reducing a calculation load required to calculate the compensation coefficient.

Another object of the present invention is to provide a flow meter device including a table containing the compensation coefficient set by the above setting method and the flow (rate).

Solution to Problem

To solve the above described problem associated with the prior art, there is provided a setting method of a flow meter device comprising: (A) measuring a compensation coefficient in a case where a fluid is flowed with a flow within a predetermined range, and deriving a first function representing as a linear function a relationship between a measurement compensation coefficient which is the measured compensation coefficient and a conversion value which is obtained by converting a set flow which is the flow of the flowed fluid, using a predetermined function; (B) setting a reference flow which is an arbitrary flow within the predetermined range and calculating a reference compensation coefficient which is a compensation coefficient corresponding to the reference flow based on the reference flow and the first function; and (C) storing the reference flow and the reference compensation coefficient corresponding to the reference flow.

In this method, the compensation (modification) coefficient can be derived with few measurement points. Also, by calculating the flow using the table containing the reference flow and the reference compensation coefficient set by the setting method of the present invention, a calculation load can be reduced, and electric power consumption can be lessened.

According to the present invention, there is provided a flow meter device comprising: a main fluid passage having a rectangular cross-section, through which a fluid flows; a plurality of fluid passages provided by arranging a plurality of partition plates in a layer form such that the partition plates are spaced apart from each other in an interior of the main fluid passage; a pair of ultrasonic transducers which are placed at an upstream side and a downstream side within a measurement fluid passage including a part or all of the plurality of fluid passages, respectively, and transmit and receive an ultrasonic wave; a propagation time measurement unit for measuring a propagation time of the ultrasonic wave between the pair of ultrasonic transducers; a flow calculation unit for calculating a flow of the fluid flowing through the measurement fluid passage by multiplying by a compensation coefficient a flow calculated based on a flow velocity derived from the propagation time measured by the propagation time measurement unit; and a storage unit; wherein the storage unit contains a reference flow and a reference compensation coefficient corresponding to the reference flow, wherein the reference flow and the reference compensation coefficient are obtained in such a manner that a first function representing as a linear function a relationship between a measurement compensation coefficient which is a compensation coefficient measured in a case where the fluid is flowed with a flow within a predetermined range, and a conversion value which is obtained by converting a set flow which is the flow of the flowed fluid, using a predetermined function, is derived, a reference flow which is an arbitrary flow within the predetermined range is set, and a reference compensation coefficient which is a compensation coefficient corresponding to the reference flow is calculated based on the reference flow and the first function.

In accordance with this configuration, the calculation load can be reduced, and the electric power consumption can be lessened.

The above and further objects, features and advantages of the present invention will more fully be apparent from the following detailed description with accompanying drawings.

Advantageous Effects of the Invention

In accordance with the setting method of the flow meter device and the flow meter device of the present invention, the compensation coefficient can be derived with few measurement points.

BRIEF DESCRIPTION OF THE DRAWINGS

FIG. 5 is a table showing examples of a set flow and a measurement compensation coefficient which are stored in a reference data storage section of the flow meter device of FIG. 4.

FIG. 8 is a table incorporating items of a conversion value, a reference flow, a first flow, and a reference compensation coefficient, into the table of FIG. 5.

DETAILED DESCRIPTION OF THE PREFERRED EMBODIMENT

According to the present invention, there is provided a setting method of a flow meter device comprising: (A) measuring a compensation coefficient in a case where a fluid is flowed with a flow within a predetermined range, and deriving a first function representing as a linear function a relationship between a measurement compensation coefficient which is the measured compensation coefficient and a conversion value which is obtained by converting a set flow which is the flow of the flowed fluid, using a predetermined function; (B) setting a reference flow which is an arbitrary flow within the predetermined range and calculating a reference compensation coefficient which is a compensation coefficient corresponding to the reference flow based on the reference flow and the first function; and (C) storing the reference flow and the reference compensation coefficient corresponding to the reference flow.

In accordance with this configuration, a calculation load can be reduced, and electric power consumption can be lessened.

In the setting method of the flow meter device according to the present invention, the step (A) may include: (A1) plotting the set flow and the measurement compensation coefficient to derive an approximate curve; (A2) setting as the predetermined function a function in which the set flow is a parameter, of an arithmetic expression representing the approximate curve derived in step (A1); and (A3) determining the first function by the predetermined function in the arithmetic expression to a variable.

In the setting method of the flow meter device according to the present invention, the step (B) may include: (B1) setting the reference flow; (B2) calculating a first flow which is a value obtained by converting the reference flow, based on the reference flow set in step (B1) and the predetermined function; and (B3) calculating the reference compensation coefficient based on the first flow calculated in step (B2) and the first function.

In the setting method of the flow meter device according to the present invention, the predetermined function may be a logarithm function.

In the setting method of the flow meter device according to the present invention, in step (B), the reference flow may be set more in number than the measured set flow.

Hereinafter, an embodiment of the present invention will be described with reference to the drawings. Throughout the drawings, the same or corresponding components are designated by the same reference symbols and will not be described repeatedly. Throughout the drawings, components required to describe the present invention are extracted and other components are sometimes omitted. Moreover, the present invention is not limited by the embodiment below.

Embodiment 1

[Configuration of Gas Meter]

Hereinafter, a description will be given of an example in which a flow meter device according to Embodiment 1 is incorporated into a gas meter.

Figure 1:
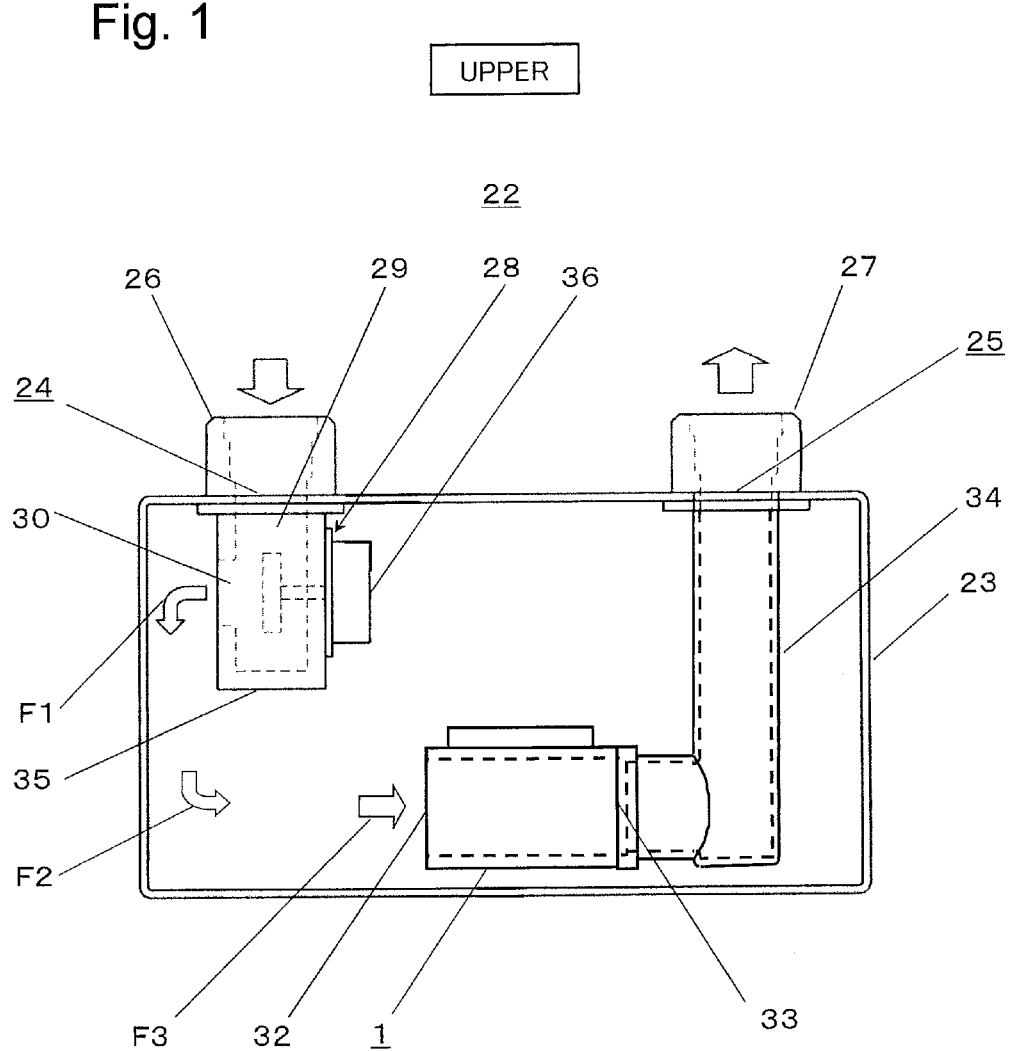
FIG. 1 is a cross-sectional view showing a schematic configuration of a gas meter incorporating a flow meter device according to Embodiment 1 of the present invention.

FIG. 1 is a cross-sectional view showing a schematic configuration of the gas meter incorporating the flow meter device according to Embodiment 1. In FIG. 1, an upper side and a lower side of the gas meter are expressed as an upper side and lower side in FIG. 1.

As shown in FIG. 1, the gas meter 22 incorporating the flow meter device 1 according to Embodiment 1 includes a casing 23 of a rectangular parallelepiped shape and a cut-off mechanism 28. The upper portion of the casing 23 is provided with an inlet section 24 comprising a through-hole and an outlet section 25 comprising a through-hole such that an interior and an exterior are communicated with each other via the inlet section 24 and the outlet section 25.

An inlet pipe 26 is coupled to the inlet section 24 from outside the casing 23, while an outlet pipe 27 is coupled to the outlet section 25 from outside the casing 23. In this construction, the gas flows into the gas meter 22 (casing 23) through the inlet pipe 26, and flows out of the gas meter 22 to the outlet pipe 27.

In the interior of the casing 23, the cut-off mechanism 28 is connected to the inlet section 24. The cut-off mechanism 28 includes a fluid passage pipe 35 through which a fluid (gas) flows, and a cut-off valve 36 for cutting-off a gas flow in the fluid passage pipe 35. An entrance end 29 of the fluid passage pipe 35 is connected to the inlet section 24, while an exit end 30 of the fluid passage pipe 35 opens in the interior of the casing 23. The cut-off valve 36 may be composed of a valve body for closing the fluid passage pipe 35 and a stepping motor for actuating the valve body. The cut-off valve 36 having such a configuration is well-known, and therefore will not be described in detail.

As described above, in the interior of the casing 23, the flow meter device 1 is placed. The flow meter device 1 includes an intake section 32 and a discharge section 33. The intake section 32 opens in the interior of the casing 23, while the discharge section 33 is connected to the outlet section 25 via a connection pipe 34.

Specifically, the flow meter device 1 is placed at the center of the lower portion of the casing 23. The intake section 32 of the flow meter device 1 is placed to face the side surface of the casing 23 at the inlet section 24 side, while the discharge section 33 of the flow meter device 1 is placed to face the side surface of the casing 23 at the outlet section 25 side. The connection pipe 34 has an L-shape and connects the discharge section 33 to the outlet section 25.

Next, the specific configuration of the flow meter device 1 will be described with reference to FIGS. 2 to 4.

[Configuration of Flow Meter Device]

Figure 2:
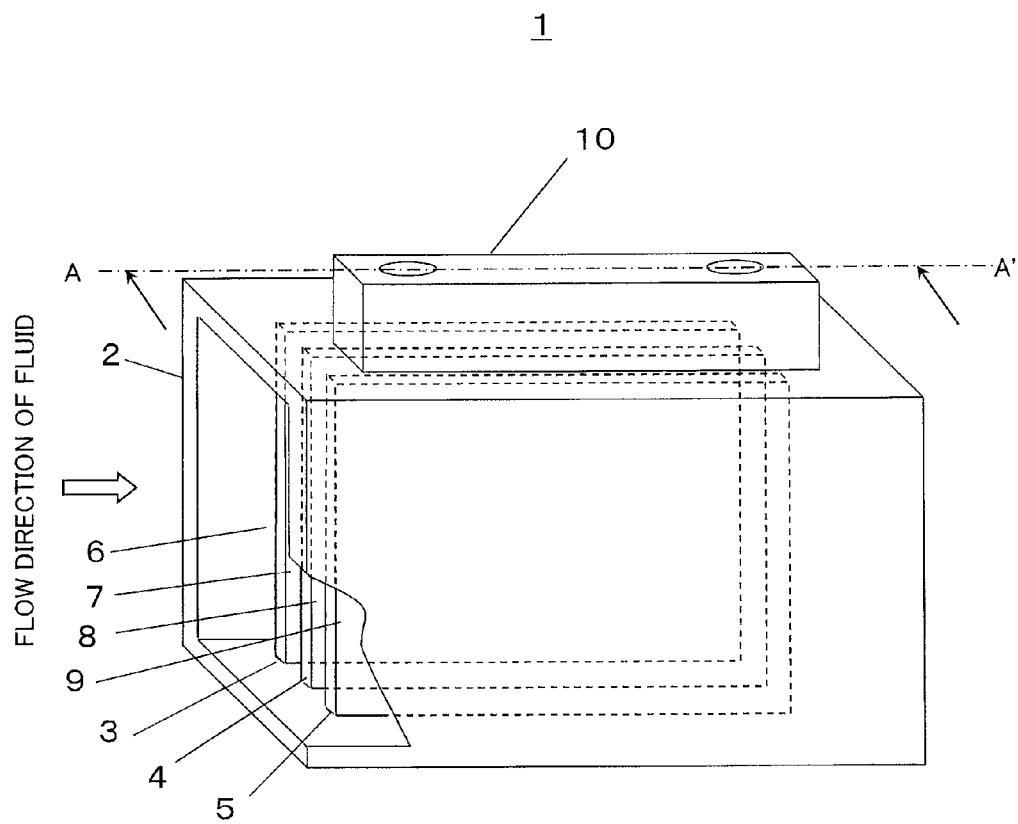
FIG. 2 is a perspective view showing a schematic configuration of the flow meter device according to Embodiment 1.

FIG. 2 is a perspective view showing a schematic configuration of the flow meter device according to Embodiment 1. FIG. 3 is a cross-sectional view of the flow meter device taken along line AA' of FIG. 2. FIG. 4 is a block diagram showing a schematic configuration of a control unit in the flow meter device of FIG. 3.

As shown in FIG. 2, the flow meter device 1 of Embodiment 1 includes a tubular member with a rectangular cross-section through which the fluid flows, and includes a main fluid passage 2 and a plurality of fluid passages 6 to 9 in the inner space of the tubular member. In addition, as shown in FIG. 3, the flow meter device 1 includes a pair of ultrasonic transducers 11, 12, and a control unit 200.

The tubular member is provided with a first partition plate 3, a second partition plate 4), and a third partition plate 5 which are arranged to be apart from each other (in a layer form such that their main surfaces are parallel to the flow direction of the fluid. The upper ends of the first to third partition plates 3 to 5 reach the top surface (upper surface 15 in FIG. 3) of the tubular member and the lower ends of the first to third partition plates 3 to 5 reach the inner bottom surface (bottom surface 16 in FIG. 3) of the tubular member.

These partition plates 3 to 5 divide the tubular member into a first fluid passage 6, a second fluid passage 7, a third fluid passage 8 and a fourth fluid passage 9.

Above the third fluid passage 8, an ultrasonic transducer retaining unit 10 is placed. Although in Embodiment 1, the third fluid passage 8 is assumed as a measurement fluid passage and the flow of the fluid flowing through this fluid passage is measured, the present invention is not limited to this. The flow meter device 1 may be configured to measure the flow of the fluid flowing through another fluid passage. Furthermore, instead of measuring the flow of the fluid flowing through only one fluid passage, the flow of the fluid flowing through plural fluid passages may be measured. Hereinafter, the third fluid passage 8 will be sometimes referred to as the measurement fluid passage 8.

Next, the ultrasonic transducer retaining unit 10 and the control unit 200 will be described with reference to FIGS. 3 and 4.

Figure 3:
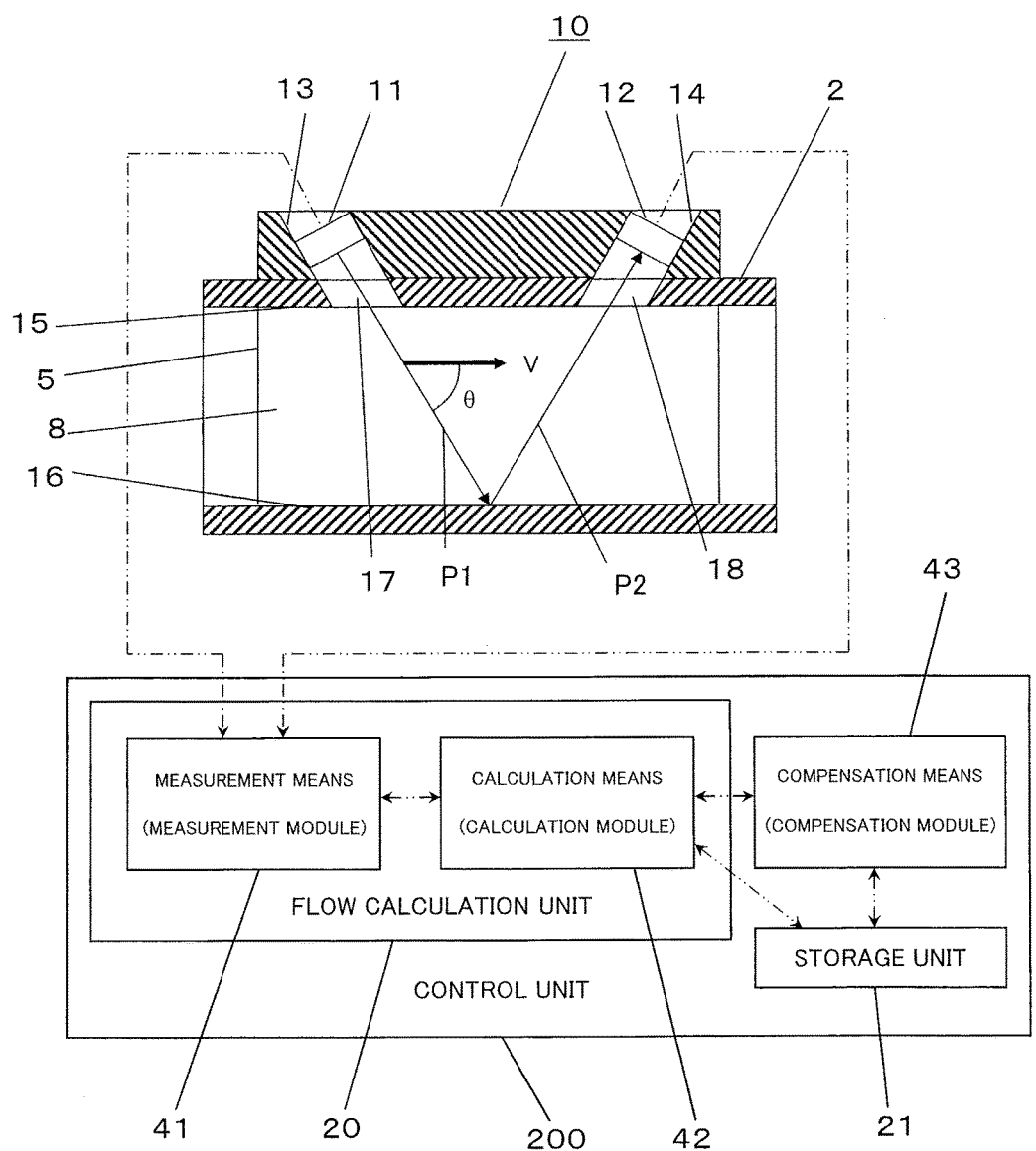
FIG. 3 is a cross-sectional view of the flow meter device taken along line AA' of FIG. 2.

As shown in FIG. 3, the ultrasonic transducer retaining unit 10 includes a pair of ultrasonic transducers composed of a first ultrasonic transducer 11 and a second ultrasonic transducer 12, a first retaining section 13, and a second retaining section 14. The first ultrasonic transducer 13 is provided at an upstream side in the flow direction of the fluid in the ultrasonic transducer retaining unit 10, while the second ultrasonic transducer 14 is provided at a downstream side in the flow direction of the fluid in the ultrasonic transducer retaining unit 10.

The first ultrasonic transducer 11 is retained by the first retaining section 13, while the second ultrasonic transducer 12 is retained by the second retaining section 14. The first ultrasonic transducer 11 and the second ultrasonic transducer 12 are configured to mutually transmit and receive an ultrasonic wave. Specifically, one of the ultrasonic transducers transmits the ultrasonic wave and the other of the ultrasonic transducers receives the ultrasonic wave. In the same manner, the other of the ultrasonic transducers transmits the ultrasonic wave and one of the ultrasonic transducers receives the ultrasonic wave. The first ultrasonic transducer 11 and the second ultrasonic transducer 12 are controlled to transmit the ultrasonic wave simultaneously.

The upper surface 15 of the tubular member is provided with a first ultrasonic wave opening 17 and a second ultrasonic wave opening 18. In contrast, the bottom surface 16 of the tubular member serves as a reflection surface of the ultrasonic wave.

As indicated by arrows P1 and P2 of FIG. 3, the ultrasonic wave transmitted from the first ultrasonic transducer 11 passes through the first ultrasonic wave opening 17, propagates across the measurement fluid passage 8, is reflected on the bottom surface 16 of the tubular member, passes through the second ultrasonic wave opening 18, and is received by the second ultrasonic transducer 12.

By comparison, the ultrasonic wave transmitted from the second ultrasonic transducer 12 passes through the second ultrasonic wave opening 18, propagates across the measurement fluid passage 8, is reflected on the bottom surface 16 of the tubular member, passes through the first ultrasonic wave opening 17, and is received by the first ultrasonic transducer 11. Note that the effective length of the propagation path of the ultrasonic wave is the same between a case where the ultrasonic wave propagates from the first ultrasonic transducer 11 to the second ultrasonic transducer 12 and a case where the ultrasonic wave propagates from the second ultrasonic transducer 12 to the first ultrasonic transducer 11.

The first ultrasonic transducer 11 and the second ultrasonic transducer 12 output to the control unit 200 information indicating that the ultrasonic wave is received. The control unit 200 measures a time that passes from when the first ultrasonic transducer 11 outputs the ultrasonic wave until the second ultrasonic transducer 12 receives it and a time that passes from when the second ultrasonic transducer 12 outputs the ultrasonic wave until the first ultrasonic transducer 11 receives it, and thus calculates the flow velocity of the fluid flowing through the measurement fluid passage 8.

Next, the control unit 200 will be described in more detail with reference to FIGS. 3 and 4.

The control unit 200 includes a flow calculation unit 20, a storage unit 21, and a compensation (modification) means (compensation module) 43. The flow calculation unit 20 includes a measurement means (measurement module) 41 and a calculation means (calculation module) 42. As the flow calculation unit 20, a microcomputer or the like may be used. The flow calculation unit 20 executes a predetermined program or the like stored in the storage unit 21, thereby implementing the measurement means 41 and the calculation means 42.

The measurement means 41 is configured to measure the time that passes from when the first ultrasonic transducer 11 outputs the ultrasonic wave until the second ultrasonic transducer 12 receives it and the time that passes from when the second ultrasonic transducer 12 outputs the ultrasonic wave until the first ultrasonic transducer 11 receives it, and output the measured time to the calculation means 42. The calculation means 42 is configured to calculate the flow velocity of the fluid flowing through the measurement fluid passage 8 based on the time measured by the measurement means 41.

The storage unit 21 is constituted by a memory or the like which contains programs executed to perform control operations, and includes a reference data storage section 211 and a numeric value table storage section 212. As will be described later, the reference data storage section 211 contains the flow (rate) (hereinafter will be referred to as set flow) pre-measured by the flow meter device 1 and a compensation (modification) coefficient (hereinafter will be referred to as measurement compensation coefficient) corresponding to the set flow. As will be described later, the numeric value table storage section 212 contains a table of the reference flow (rate) calculated (set) by an interpolation line setting section 432 and a reference compensation coefficient which is a compensation coefficient of the reference flow.

The compensation means 43 includes a compensation coefficient setting section 431 and the interpolation line setting section 432. The compensation coefficient setting section 431 is configured to set the compensation coefficient corresponding to the flow (rate) calculated by the flow calculation unit 20 with reference to the table stored in the numeric value table storage section 212, in a case where the gas meter 22 is installed in, for example, home, a factory, or the like, and the flow (rate) of the fluid (natural gas or the like) used in home or the like is actually measured. The interpolation line setting section 432 is configured to set the reference flow and the reference compensation coefficient based on the set flow stored in the reference data storage section 211.

[Measurement Method of Flow Meter Device]

Next, measurement of the flow (rate) of the flow meter device 1 according to Embodiment 1 will be described more specifically with reference to FIG. 2.

V indicates the flow velocity of the fluid flowing through the measurement fluid passage 8, C indicates the sound velocity of the ultrasonic wave in the fluid, θ indicates an angle formed between a direction in which the fluid flows and a direction in which the ultrasonic wave propagates before it is reflected on the bottom surface 16. Also, L indicates the effective length of the propagation path of the ultrasonic wave propagating between the first ultrasonic transducer 11 and the second ultrasonic transducer 12. In this case, a propagation time t1 of the ultrasonic wave transmitted from the first ultrasonic transducer 11 to the second ultrasonic transducer 12 is represented by the expression (1):

$$t1 = L/(C + V \cos \theta) \quad (1)$$

A propagation time t2 of the ultrasonic wave transmitted from the second ultrasonic transducer 12 to the first ultrasonic transducer 11 is represented by the expression (2):

$$t2 = L/(C - V \cos \theta) \quad (2)$$

When the sound velocity C of the fluid is deleted from the expressions (1) and (2), the expression (3) is derived:

$$V = L/[2 \cos \theta \{(1/t1) - 1/t2)\}] \quad (3)$$

As can be seen from the expression (3), if L and θ are known, the flow velocity V is derived using the propagation time t1 and the propagation time t2 which are measured by the measurement means 41.

As shown in the expression (4), the calculation means 42 can calculate the flow (rate) Q of the entire main fluid passage 2 by multiplying the flow velocity V by the cross-sectional area S of the main fluid passage 2:

$$Q = V \times S \quad (4)$$

However, in general, the flow velocity V of the measurement fluid passage 8 is different from the average flow velocity Vave of the entire main fluid passage 2. Therefore, as indicated by the expression (5), the actual flow Qt is derived by multiplying the flow velocity Q by the compensation coefficient k:

$$Qt = k \times Q \quad (5)$$

[Setting Method of Flow Meter Device]

If the flow velocity of the fluid in the measurement fluid passage 8 indicates the average flow velocity in the overall flow meter device 1, the compensation coefficient is close to 1 and constant, and thus, accurate flow measurement can be carried out.

However, in actual cases, as should be understood from the configuration of the gas meter 22 of FIG. 1, the flow velocity distribution of the fluid inflowing through the intake section 32 is varied depending on how the flow meter device 1 is placed in the interior of the casing 23. In more detail, the flow velocity distribution of the fluid inflowing through the intake section 32 of the flow meter device 1 is varied depending on the shape and volume of the casing 23, the position of the exit end 30 of the cut-off mechanism 28, the position of the flow meter device 1 (intake section 32) and the shape of the connection pipe 34.

In light of this, in the flow meter device 1 of Embodiment 1, the compensation coefficient is set as described below. The compensation coefficient is typically set in a period before the gas meter 22 is shipped to the user after the flow meter device 1 is incorporated into the gas meter 22 in a factory, etc.

Initially, the flow meter device 1 is installed in the gas meter 22, and the compensation coefficient (measurement compensation coefficient) in a case where the fluid is flowed with a predetermined flow (set flow) through the gas meter 22 is measured and stored in the reference data storage section 211 of the storage unit 21. Specifically, the fluid is flowed with a predetermined flow through the gas meter 22, and the flow of the fluid measured by the flow meter device 1 is calculated based on the propagation time t1 and the propagation time t2 which are measured by the measurement means 41 of the flow meter device 1. Then, the measurement compensation coefficient is calculated based on the calculated flow and the predetermined flow of the fluid flowed actually. The calculated measurement compensation coefficient and the set flow are stored in the reference data storage section 211. Examples of the calculated measurement compensation coefficient and the set flow are shown in FIGS. 5 and 6.

Figure 4:
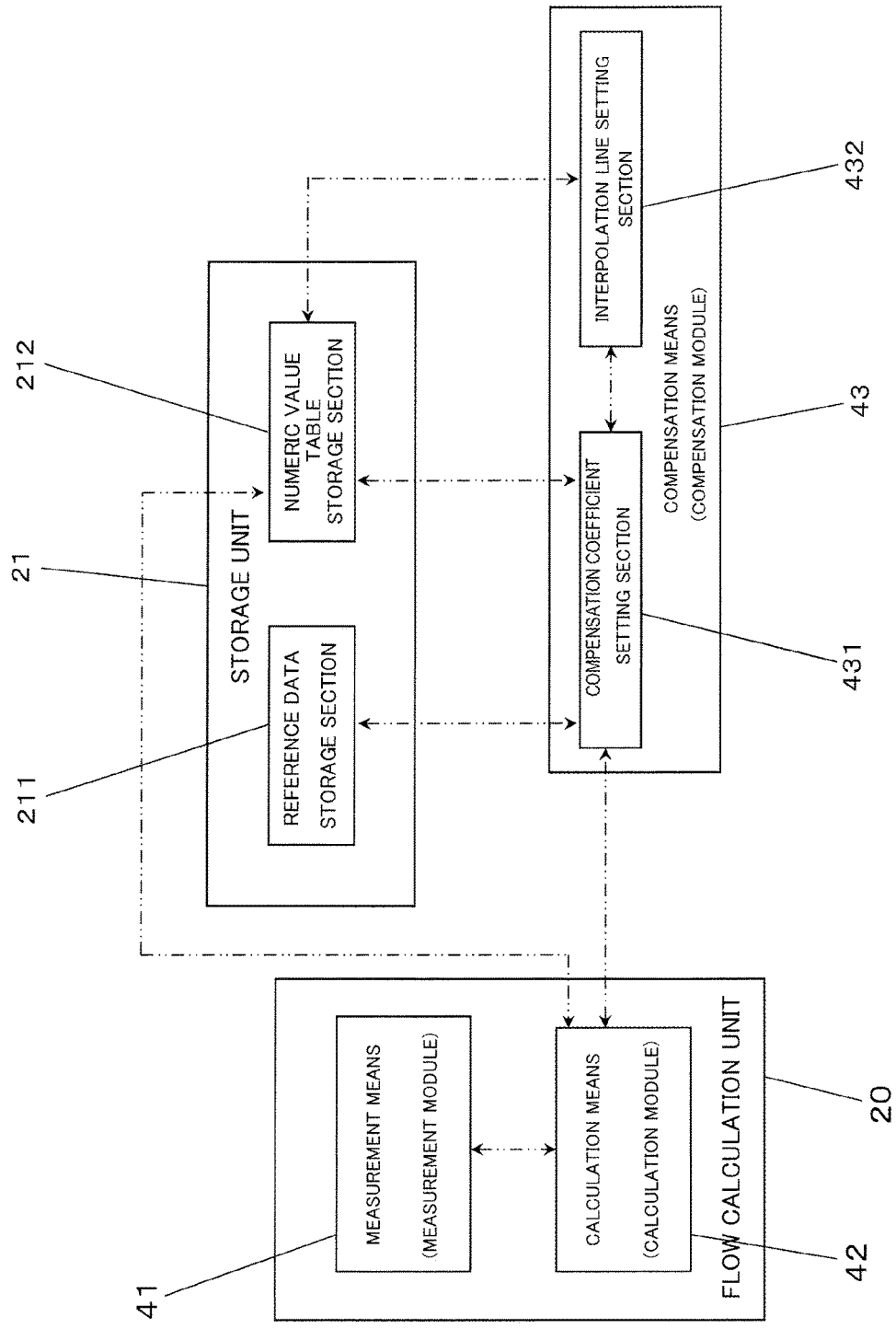
FIG. 4 is a block diagram showing a schematic configuration of a control unit in the flow meter device of FIG. 3.

FIG. 5 is a table showing examples of the set flow and the measurement compensation coefficient which are stored in the reference data storage section of the flow meter device of FIG. 4. FIG. 6 is a graphical representation of the table of FIG. 5.

Figure 6:
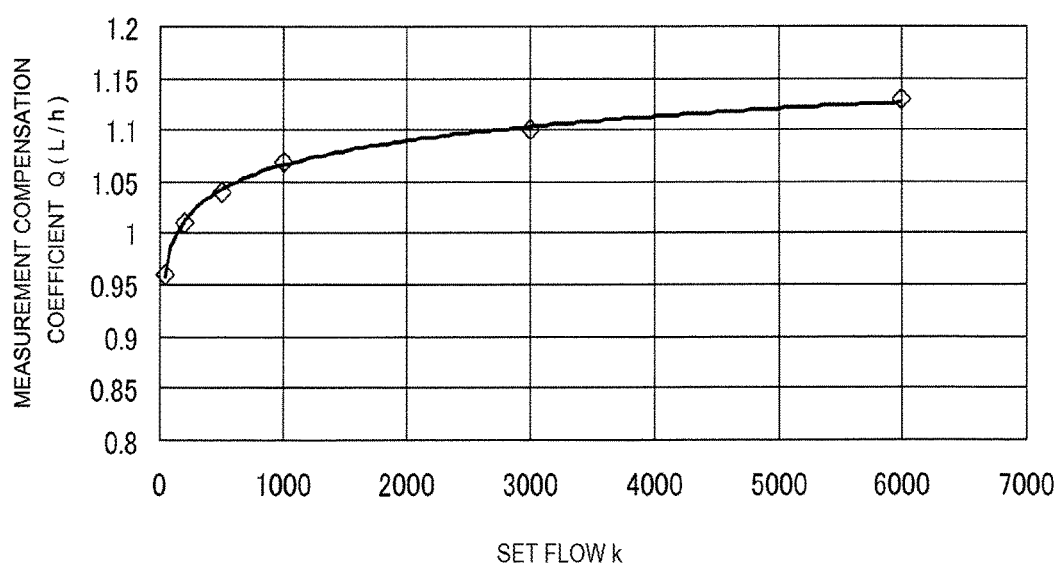
FIG. 6 is a graphical representation of the table of FIG. 5.

As can be seen from FIG. 6, the graph derived by plotting the set flows and the measurement compensation coefficients is not a straight line (linear function). For this reason, in the flow coefficient setting method disclosed in the above mentioned Patent Literature 1, many measurement points are taken, and the range which can be approximated as the straight line is derived trial and error.

However, in this method, the efficiency of a work for setting the compensation coefficient is low. To avoid this, in the flow meter device 1 of Embodiment 1, a first function representing as a linear function the relationship between the measurement compensation coefficient obtained by measurement and a conversion value obtained by converting the set flow which is the flow of the fluid flowed, using a predetermined function, is found, thereby improving the efficiency of a work for setting the compensation coefficient.

This will be specifically described with reference to FIG. 7.

Figure 7:
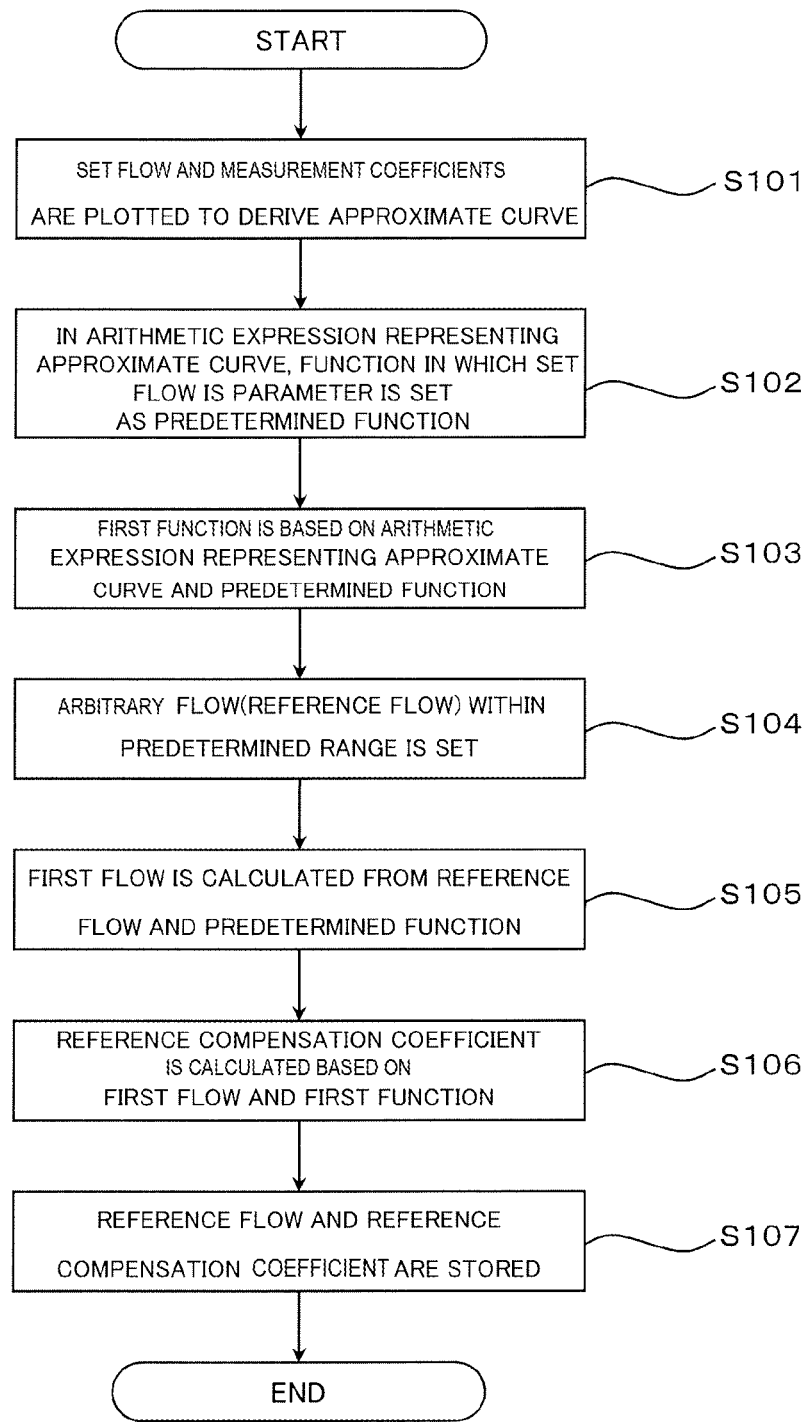
FIG. 7 is a flowchart showing a setting method of a flow meter device of Embodiment 1.

FIG. 7 is a flowchart showing the setting method of the flow meter device of Embodiment 1.

As shown in FIG. 7, firstly, the set flows and the measurement compensation coefficients are plotted to derive an approximate curve (step S101). Although a logarithm function is used in Embodiment 1 to derive the approximate curve, the present invention is not limited to this. For example, an exponential function or a high-order function may be used. The approximate curve may be derived in such a manner that the entire region of a range (predetermined range; 40 to 6000 L/h) of a group of the measured flows is derived by one function, or may be derived for each of divided ranges.

Next, in arithmetic expression representing the approximate curve derived in step S101, the function in which the set flow is a parameter is set as a predetermined function (step S102). Specifically, in the example of FIG. 6, the arithmetic expression representing the approximate curve is expressed as expression (formula) (6):

$$k = 0.0777 \times \text{Log } Q + 0.8333 \quad (6)$$

Therefore, in step S103, the logarithm function (Log Q) in which the set flow is a parameter, in the expression (6), is set as the predetermined function.

Then, the first function is set based on the arithmetic expression representing the approximate curve derived in step S101 and the predetermined function (logarithm function) set in step S102 (step S103). Specifically, regarding the arithmetic expression representing the approximate curve derived in step S101, the first function is determined by setting the predetermined function set in step S102 to a variable (replacing the predetermined function by a variable). That is, in the expression (6), by setting Log Q to a variable (X), the expression (6) is transformed into the expression (7), and the expression (7) is a linear function of X, i.e., first function:

$$k = 0.0777 \times X + 0.8333 \quad (7)$$

Alternatively, the conversion value may be calculated by converting the set flow using the predetermined function (logarithm function) (step S102), the calculated conversion values and the measurement compensation coefficients may be plotted to derive an approximate line, and the derived approximate line may be set as the first function.

In a case where the flow of the fluid used in home or the like is actually measured after shipping from the factory, it is necessary to calculate the conversion value obtained by converting the set flow using the logarithm function as the predetermined function, in order to set the compensation coefficient from the flow (hereinafter will be referred to as measurement flow) calculated by the flow calculation unit 20. However, if the flow calculation unit 20 (microcomputer) of the flow meter device 1 calculates the conversion value, then a calculation load increases, and electric power used to execute the calculation increases.

In light of this, in the flow meter device 1 of Embodiment 1, for example, before shipment from the factory, a reference flow which is an arbitrary flow within the measurement flow range is set, and the interpolation line setting section 432 causes the numeric value table storage section 212 to store a table of the reference flow and the reference compensation coefficient which is the compensation coefficient corresponding to the reference flow. Hereinafter, this will be described specifically with reference to FIGS. 6, 8, and 9.

Figure 9:
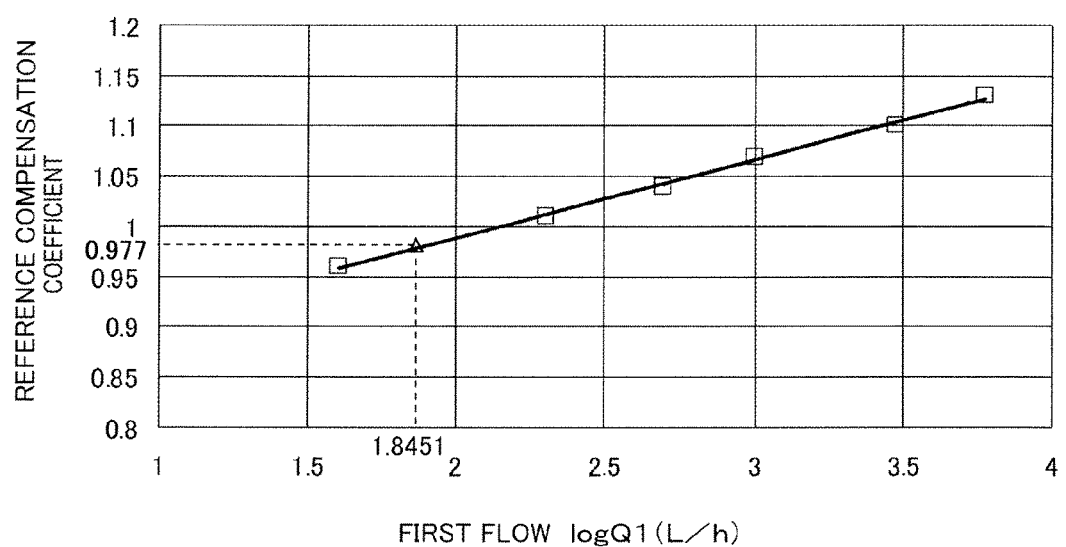
FIG. 9 is a graph showing the relationship between the first flow and the reference compensation coefficient.
Figure 10:
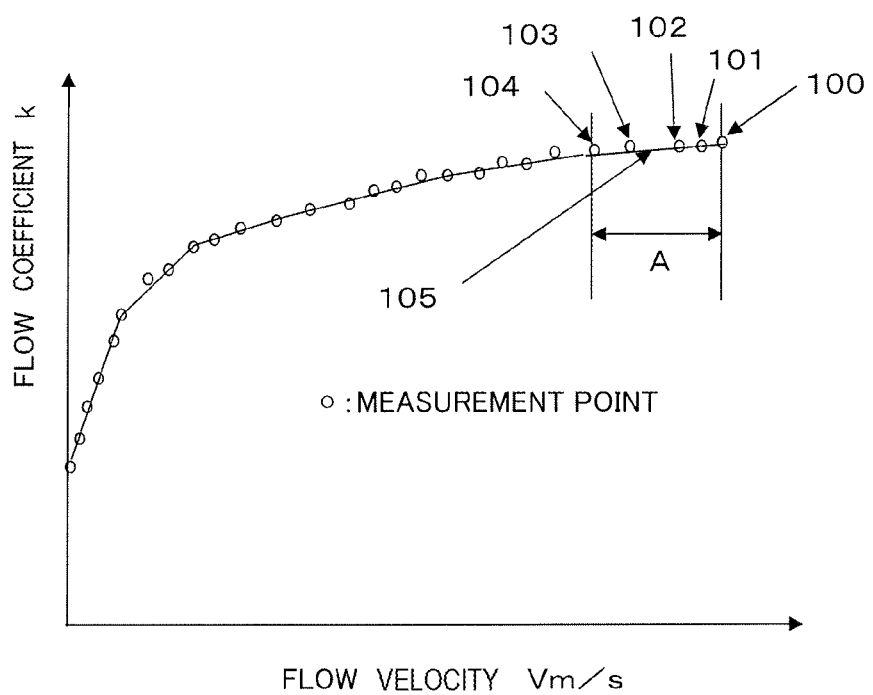
FIG. 10 is a graph showing a flow velocity (V), a flow coefficient (K), and an approximate line thereof, disclosed in Patent Literature 1.

FIG. 8 is a table incorporating items of the conversion value, the reference flow, the first flow, and the reference compensation coefficient, into the table of FIG. 5. FIG. 9 is a graph showing the relationship between the first flow and the reference compensation coefficient.

As shown in FIG. 7, an arbitrary flow (reference flow Q1) within a predetermined range (40 to 6000 L/h) is set (step S104). In the example of FIG. 8, as the reference flow Q1, 40, 70, 200, 300, 450, 500, 750, 1000, 2000, 3000, and 6000 (L/h) are set.

Then, the first flow (Log Q1 (L/h)) is calculated from the reference flow set in step S104 and the predetermined function (logarithm function; Log Q) set in step S102 (step S105). Then, the reference compensation coefficient corresponding to the first flow calculated in step S105 is calculated based on the first function (step S106).

Specifically, for example, in a case where the reference flow Q1 is 70 (L/h), the first flow (Log Q1) is 1.8451 (L/h). As shown in FIG. 9, when the reference compensation coefficient corresponding to the first flow of 1.8451 (L/h) is calculated from the expression (7) which is the first function, the reference compensation coefficient K1 is 0.977.

In the above described manner, the reference compensation coefficient corresponding to each reference flow is calculated, and the reference flow and the reference compensation coefficient corresponding to the reference flow are stored in the numeric value table storage section 212 (step S107).

Thus, the compensation coefficient corresponding to the flow other than the set flow pre-measured can be found. That is, the compensation coefficients can be found with few measurement points. The number of reference flows is preferably set more than the number of set flows, to improve the accuracy of the compensation coefficients. Although in Embodiment 1, the reference flow is set, the first flow is calculated from the reference flow, and then the reference compensation coefficient is derived, the present invention is not limited to this. The first flow may be set, and then the reference flow and the reference compensation coefficient may be found from the set first flow.

The compensation coefficient of the flow (measurement flow) between the reference flows is calculated by linear interpolation. More specifically, as shown in FIG. 9, the compensation coefficient setting section 431 calculates the compensation coefficient corresponding to the flow calculated by the calculation means 42 with reference to the table of the reference flow and the reference compensation coefficient of FIG. 9.

Specifically, when the flow meter device 1 according to Embodiment 1 actually measures the flow of the fluid used in the home or the like, it calculates the flow as follows.

Firstly, the calculation means 42 calculates the flow (flow before being compensated by the compensation coefficient; measurement flow) of the fluid measured by the flow meter device 1, based on the propagation time t1 and the propagation time t2 which are measured by the measurement means 41. Then, the compensation coefficient setting section 431 calculates the compensation coefficient corresponding to the flow calculated by the calculation means 42 with reference to the numeric value table storage section 212. The calculation means 42 calculates a genuine flow of the fluid based on the compensation coefficient calculated by the compensation coefficient setting section 431.

Specifically, for example, when the calculation means 42 calculates 1500 L/h, as the actual measurement value of the flow measured by the flow meter device 1, this flow falls within a range between the reference flow 1000 L/h and the reference flow 2000 L/h. Therefore, the compensation coefficient setting section 431 calculates (sets) the compensation coefficient (1.080) of 1500 L/h by linear interpolation using the reference compensation coefficients corresponding to the reference flow 1000 L/h and the reference flow 2000 L/h, in the table stored in the numeric value table storage section 212. Then, the calculation means 42 calculates a genuine flow (1500×1.080=1620 L/h) of the fluid, based on the compensation coefficient (1.080) calculated by the compensation coefficient setting section 431.

As described above, in the flow meter device 1 of Embodiment 1, since the first function is found based on the set flow and the measurement compensation coefficient, and the reference compensation coefficient is set based on the first function and the reference flow set arbitrarily, the compensation coefficient can be found with few measurement points.

In addition, in the flow meter device 1 of Embodiment 1, the compensation coefficient can be set without using a complex function such as the logarithm function and the high-order function, when the flow of the fluid used in the home or the like is actually measured. This can reduce a calculation load of the flow calculation unit 20, and lessen electric power consumption.

Although in Embodiment 1, the compensation coefficient corresponding to the flow, which is obtained after the flow is obtained, has been exemplarily described, the compensation coefficient corresponding to the flow velocity, for compensating the flow velocity, can be set in the same manner in principle.

When it can be estimated that the first function is the linear function (it can be estimated that the relationship between the set flow and the compensation coefficient predicted over the whole range of the set flow is the linear function) in a case where the flow meter device 1 is installed in the gas meter 22, in the factory or the like, and the compensation coefficient is set, the compensation coefficient may be set as follows. Two points of the set flows are taken, and the measurement compensation coefficients corresponding to the two set flows are calculated to derive the first function, and the compensation coefficient may be set.

Numeral modifications and alternative embodiments of the present invention will be apparent to those skilled in the art in view of the foregoing description. Accordingly, the description is to be construed as illustrative only, and is provided for the purpose of teaching those skilled in the art the best mode of conveying out the invention. The details of the structure and/or function may be varied substantially without departing from the spirit of the invention.

INDUSTRIAL APPLICABILITY

A setting method of a flow meter device and a flow meter device of the present invention have an advantage that they can derive compensation coefficients with few measurement points, and can lessen electric power consumption.

The invention claimed is:

1. A flow meter device comprising:
   a main fluid passage having a rectangular cross-section, through which a fluid flows;
   a plurality of fluid passages provided by arranging a plurality of partition plates in a layer form such that the partition plates are spaced apart from each other in an interior of the main fluid passage;
   a pair of ultrasonic transducers which are placed at an upstream side and a downstream side within a measurement fluid passage including a part or all of the plurality of fluid passages, respectively, and transmit and receive an ultrasonic wave;
   a propagation time measurement unit for measuring a propagation time of the ultrasonic wave between the pair of ultrasonic transducers;
   a storage unit storing a plurality of set flow values and a plurality of compensation coefficients corresponding to the set flow values, the compensation coefficients configured to be preset as to the set flow values such that the compensation coefficients are obtained after the set flow values are obtained;
   a flow calculation unit for calculating an actual flow of the fluid flowing through the measurement fluid passage by adjusting a flow calculated based on a flow velocity derived from the propagation time measured by the propagation time measurement unit with a corresponding compensation coefficient; and
   wherein the storage unit further contains a plurality of reference flow values and a plurality of reference compensation coefficients corresponding to the reference flow values, wherein the reference flow includes arbitrary flow values within a predetermined range;
   wherein the flow calculation unit calculates the reference compensation coefficients in such a manner that a first function representing, as a linear function, a relationship between each compensation coefficient and a conversion value, is derived based on the set flow values and the compensation coefficients,
   wherein the conversion value corresponds to a converted value of the set flow values using a predetermined function; and
   the reference compensation coefficients are set based on the first function and the reference flow values.

2. A flow meter device comprising:
a main fluid passage having a rectangular cross-section, through which a fluid flows;
a plurality of fluid passages provided by arranging a plurality of partition plates in a layer form such that the partition plates are spaced apart from each other in an interior of the main fluid passage;
a pair of ultrasonic transducers which are placed at an upstream side and a downstream side within a measurement fluid passage including a part or all of the plurality of fluid passages, respectively, and transmit and receive an ultrasonic wave;
a propagation time measurement unit for measuring a propagation time of the ultrasonic wave between the pair of ultrasonic transducers;
a flow calculation unit for calculating a flow of the fluid flowing through the measurement fluid passage and comprising a microcomputer;
a storage unit that stores a plurality of set flow values and measurement compensation coefficients corresponding to the set flow values;
a predetermined program, when executed, causes the microcomputer to:
  derive a first function representing as a linear function a relationship between a measurement compensation coefficient and a conversion value, wherein the conversion value is obtained by converting a set flow which is the flow of the flowed fluid, using a predetermined function;
  set a reference flow which is an arbitrary flow within a predetermined range; and
  calculate a reference compensation coefficient which is a compensation coefficient corresponding to the reference flow based on the reference flow and the first function;
wherein the storage unit further stores the reference flow and the reference compensation coefficient.

3. The flow meter device according to claim 2, wherein the predetermined program, when executed, further causes the microcomputer to:
  plot the set flow and the measurement compensation coefficient to derive an approximate curve;
  set as the predetermined function a function in which the set flow is a parameter, of an arithmetic expression representing the derived approximate curve; and
  determine the first function by setting the predetermined function in the arithmetic expression to a variable.

4. The flow meter device according to claim 3, wherein the predetermined program, when executed, further causes the microcomputer to:
  calculate a first flow which is a value obtained by converting the reference flow, based on the reference flow set and the predetermined function; and
  calculate the reference compensation coefficient based on the first flow calculated and the first function.

5. The flow meter device according to claim 2, wherein the predetermined function is a logarithm function.

6. The flow meter device according to claim 2, wherein the reference flow includes more values than the measured set flow.

* * * * *